United States Patent
Rodgers et al.

(10) Patent No.: US 8,431,025 B2
(45) Date of Patent: Apr. 30, 2013

(54) METHOD AND APPARATUS FOR BIOLOGICALLY PROCESSING FLUID

(75) Inventors: Michael Rodgers, Salthill (IE); John Mulqueen, Ballinrobe (IE); Rose C. Mulqueen, legal representative, Ballinrobe (IE); Edmond O'Reilly, Clonmel (IE); Xinmin Zhan, Galway (IE)

(73) Assignee: National University of Ireland, Galway (IE)

( * ) Notice: Subject to any disclaimer, the term of this patent is extended or adjusted under 35 U.S.C. 154(b) by 1018 days.

(21) Appl. No.: 11/631,878

(22) PCT Filed: Jul. 7, 2005

(86) PCT No.: PCT/EP2005/007452
§ 371 (c)(1),
(2), (4) Date: Nov. 13, 2008

(87) PCT Pub. No.: WO2006/003025
PCT Pub. Date: Jan. 12, 2006

(65) Prior Publication Data
US 2009/0139928 A1    Jun. 4, 2009

(30) Foreign Application Priority Data
Jul. 7, 2004   (IE) .................................. S2004/0462

(51) Int. Cl.
C02F 3/00    (2006.01)

(52) U.S. Cl.
USPC .......... 210/615; 210/616; 210/617; 210/618; 210/619; 210/255; 210/262

(58) Field of Classification Search .......... 210/615–619, 210/255, 261–262
See application file for complete search history.

(56) References Cited

U.S. PATENT DOCUMENTS

| | | | |
|---|---|---|---|
| 4,177,147 A | 12/1979 | Roberts | |
| 4,351,721 A | 9/1982 | Frandsen | |
| 4,414,919 A * | 11/1983 | Hess | 119/259 |
| 5,080,793 A * | 1/1992 | Urlings | 210/603 |
| 5,679,253 A * | 10/1997 | Fuerst et al. | 210/619 |
| 5,863,433 A * | 1/1999 | Behrends | 210/602 |
| 5,958,239 A * | 9/1999 | Sing | 210/605 |
| 2003/0111408 A1* | 6/2003 | Austin et al. | 210/601 |
| 2004/0140577 A1* | 7/2004 | Ringo et al. | 261/94 |

* cited by examiner

*Primary Examiner* — Chester Barry
(74) *Attorney, Agent, or Firm* — Gardner, Linn, Burkhart & Flory, LLP

(57) ABSTRACT

The present invention provides an apparatus and method for biologically treating fluids, in particular municipal or industrial wastewater or the like, the apparatus comprising a pair of reservoirs each containing growth medium having a biofilm thereon, the apparatus being arranged to pump the wastewater from one reservoir to another such as to alternatively expose the biofilms within the reservoirs to air and wastewater, thus making it possible to achieve sequential aerobic, anoxic and anaerobic conditions in the biofilms.

22 Claims, 2 Drawing Sheets

METHOD AND APPARATUS FOR BIOLOGICALLY PROCESSING FLUID

The present invention is concerned with a method and apparatus for biologically processing fluid, in particular wastewater or the like, and specifically to remove contaminants such as biodegradable organic carbon, nitrogen, and phosphorus.

Wastewater or sewage is polluted water released from residences, businesses, and municipal/industrial/agricultural sources, and must be suitably treated, by reducing or removing organic matter, disease causing organisms, and other pollutants therefrom, before being released back into the environment, or being re-used. Examples of the municipal re-use of treated wastewater would be use in the construction sector, for example on construction sites or the like, irrigation, for example of gardens, golf courses etc., the washing of vehicles or the like, toilet discharge, or in fire control applications. Treated wastewater can also be re-used for industrial purposes, for example in cooling systems or material transport. However, in order to allow the re-use of wastewater, it is necessary to substantially remove organic matter, nitrogen and phosphorus, these being three main wastewater borne sources of pollution resulting in environmental damage.

The most effective and economic method for the treatment of wastewater is the biological processing thereof using some form of biomass, thereby achieving aerobic processing, anoxic processing, anaerobic processing, or a combination thereof. The biomass is generally contained within some form of reactor, or as a biofilm on a suitable substratum, with which the wastewater is brought into contact. The biological processes result in the removal of organic carbon and phosphorus from the wastewater, the carbon being consumed both by the biomass, and the nitrification and denitrification of any nitrogen in the wastewater. Nitrification is the biological process of converting ammonium firstly to nitrite, and subsequently to nitrate. This process is achieved in two stages, the first being the conversion of ammonium into nitrite by micro-organisms known as nitrosomonas, and a second stage in which the nitrite is converted into nitrate, by micro-organisms known as nitrobacter. The nitrate must then be converted, by the biological process of denitrification, into nitrogen and other gaseous end products. Denitrification occurs in an anoxic environment in the presence of nitrates and an organic carbon source.

A large number of biomass based systems or reactors exist for the treatment of wastewater, whether on a large or small scale, for example biological aerated filters (BAF), moving media biofilm reactor systems (MMBR), sand filters and peat filter systems. BAF systems normally consist of plastic media immersed in the wastewater to be treated. Biofilms develop on these media and receive their oxygen from compressed air that is diffused into the treatment reactor. These biofilms use the substrates in the wastewater and the diffused oxygen to generate new cells which, when they become separated from the plastic media, can be settled out in a clarifier and the treated water can be discharged to a watercourse. BAF systems can become clogged and may need a mechanism for dislodging the clogged material from the plastic media. In addition, the compressed air may not supply adequate oxygen throughout the system, and the compressor itself will require maintenance.

MMBR systems consist of small plastic elements that are suspended in the reactor using the motion of the wastewater caused by a compressor or mixer. Biofilms develop on these elements. However, the elements can be completely bridged with biofilm growth and must be retained in the reactors. This retention can cause problems and a compressor is required.

Sand filters consist of a layer of graded sand, approximately 0.6 to 0.9 metres deep, with particles within a particular size range through which the wastewater is percolated. Biofilm builds on the sand particles and carries out the necessary treatment. A plan area of about 4 $m^2$ per person is required to avoid clogging, which is a common occurrence and may occur due to variable loading. Clogging requires significant maintenance of the system. In addition, suitable sand may not be available locally. A peat filter system consists of a layer of peat fibre, approximately 0.6 metres deep, through which the wastewater is percolated. Again clogging is common and can occur due to variable loading, thereby requiring significant maintenance.

All of the above systems utilise a biofilm of one form or other. There are also a large number of suspended biomass reactors, commonly known as activated sludge reactors, in which biomass is freely suspended within wastewater contained within a suitable tank. Such reactors are however more sensitive to variations in the loading thereof, in addition to disturbances therein, and also require prolonged settlement of the suspended biomass before decanting of the processed wastewater can be undertaken. Biofilm based reactors do however suffer from a number of disadvantages of their own. The growth media on which the biofilms colonise are prone to clogging due to excessive growth of the biofilm, and the reactors may form dead zones therein, depending on the type of growth medium used (fixed or mobile), wherein the wastewater is substantially immobile, and thus contact between the biofilm and the wastewater is unsatisfactory. Regardless of the type of reactor, whether biofilm or activated sludge, it is almost always necessary to incorporate some form of oxygenation system, to pump air or oxygen through the wastewater, in order to supply the biomass (whether suspended or a biofilm) with a continued supply of oxygen in order to carry out the aerobic processing of the wastewater. These oxygenation systems therefore add to the cost and complexity of the reactors.

It is therefore an object of the present invention to provide an apparatus for biologically processing fluid, which apparatus is capable of effecting the aerobic processing of the fluid without requiring a separate supply of oxygen to be pumped through the wastewater.

It is a further object of the present invention to provide an apparatus for biologically processing fluid, utilising a growth medium for the colonisation of a biofilm thereon, which growth medium is not susceptible to clogging.

According to a first aspect of the present invention there is provided an apparatus for biologically processing fluid, the apparatus comprising a first reservoir containing growth medium for supporting a biofilm thereon; and a second reservoir adapted to receive fluid from the first reservoir in order to maintain the fluid, in use, out of contact with the biofilm, thereby exposing the biofilm in order to promote aerobic growth.

Preferably, the second reservoir contains growth medium for supporting a biofilm thereon.

Preferably, the apparatus further comprises transfer means for transferring fluid between the first reservoir and the second reservoir.

Preferably, the transfer means is adapted to aerate the fluid during transfer of the fluid between the reservoirs.

Preferably, the transfer means comprises a first hydraulic conduit extending from the first reservoir to the second reservoir.

Preferably, the transfer means further comprises a second hydraulic conduit extending from the second reservoir to the first reservoir.

Preferably, the transfer means comprises at least one pump in operative association with either the first hydraulic conduit and/or the second hydraulic conduit.

Preferably, the reservoirs are adapted to permit the gravity driven flow of fluid from the second reservoir to the first reservoir.

Preferably, the or each hydraulic conduit extends from at or adjacent a base of the respective reservoir.

Preferably, the or each hydraulic conduit is arranged to feed the respective reservoir from a position at or adjacent a top of the reservoir.

Preferably, the apparatus comprises means for dispersing the fluid exiting the or each hydraulic conduit.

Preferably, the apparatus comprises a timer for operating the transfer means at set intervals.

Preferably, the apparatus comprises one or more sensors in operative association with the transfer means, the one or more sensors being arranged to actuate the transfer means when the water in the first and/or the second reservoir reaches a pre-determined level.

Preferably, the apparatus comprises means for introducing fluid into the first and/or the second reservoir.

Preferably, the apparatus comprises means for withdrawing fluid from the first and/or the second reservoir.

Preferably, the reservoirs are adapted to be stacked one above the other.

Preferably, the growth medium is substantially vertically oriented within the or each reservoir.

Preferably, the growth medium comprises an array of, in use, vertically oriented tubular elements.

According to a second aspect of the present invention there is provided a method for biologically processing fluid, the method comprising the steps of introducing the fluid into a first reservoir containing growth medium supporting a biofilm thereon; transferring at least a portion of the fluid into a second reservoir in order to expose at least a portion of the biofilm in the first reservoir; and returning at least a portion of the fluid from the second reservoir to the first reservoir.

Preferably, the method comprises the step of providing, in the second reservoir, growth medium supporting a biofilm thereon.

Preferably, the method comprises pumping the fluid between the first and second reservoirs in order to effect aeration of the fluid.

Preferably, the method comprises automatically transferring the fluid between the reservoirs after a pre-determined interval.

Preferably, the method comprises drawing the fluid from the respective reservoir from at or adjacent a base thereof.

Preferably, the method comprises introducing the fluid into the respective reservoir from at or adjacent a top thereof.

Preferably, the method comprises dispersing the fluid during entry to the respective reservoir.

Preferably, the method comprises locating one reservoir above the other in order to allow the gravity driven flow of fluid from the raised reservoir.

The present invention will now be described with reference to the accompanying drawings, in which.

Figure 1:
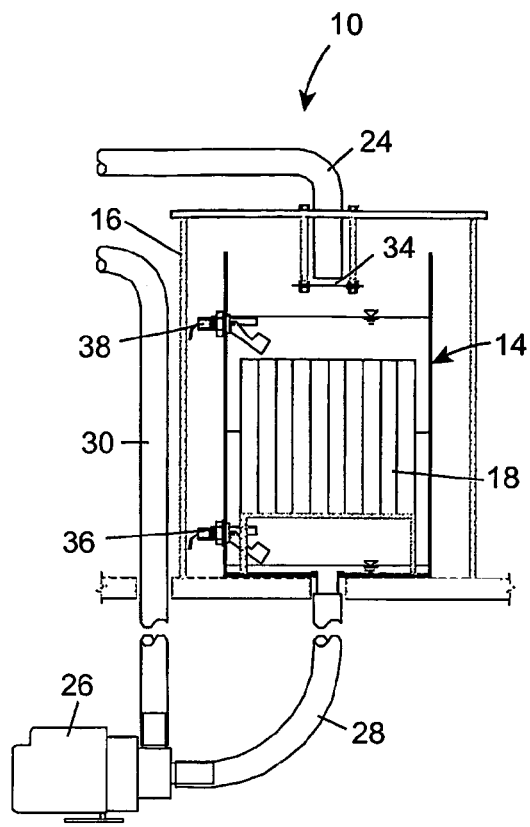
FIG. 1 illustrates a sectioned side elevation of a first embodiment of an apparatus according to the present invention.
Figure 2:
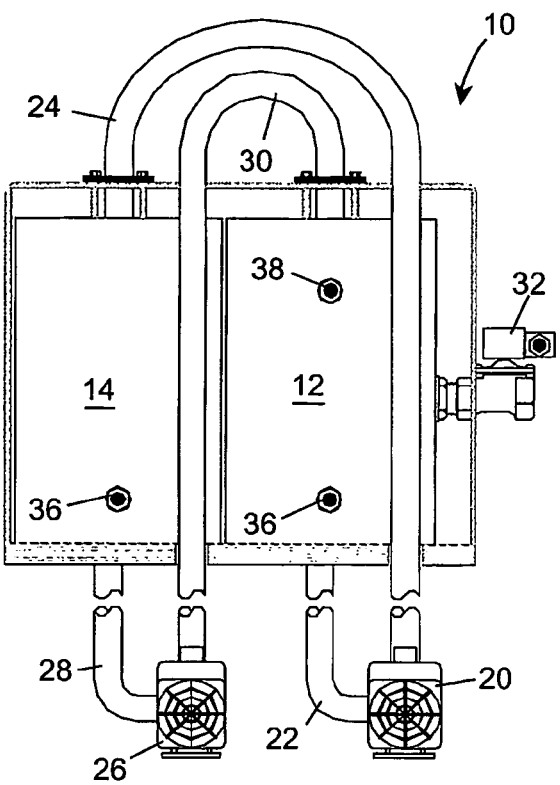
FIG. 2 illustrates a front elevation of the apparatus of FIG. 1.
Figure 3:
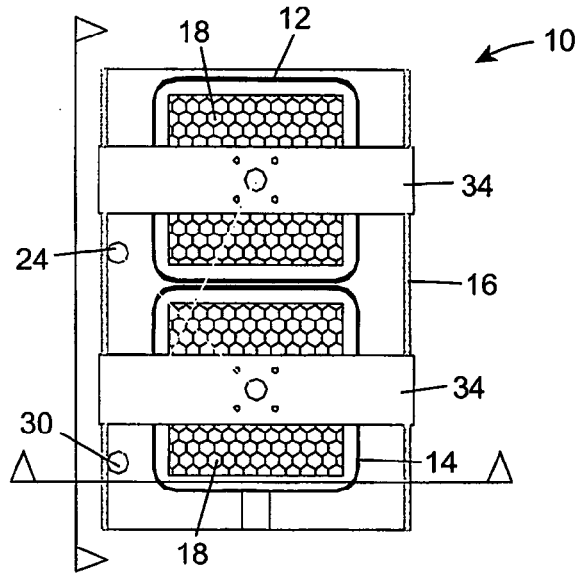
FIG. 3 illustrates a plan view of the apparatus of FIG. 1.

Referring now to FIGS. 1 to 3 of the accompanying drawings, there is illustrated a first embodiment of an apparatus according to the present invention, generally indicated as 10, for use in the biological processing of fluid (not shown), for example wastewater from industrial, commercial or residential sources, or any other fluids suitable for biological processing using the apparatus 10.

The apparatus 10 comprises a first reservoir 12 and a second reservoir 14 which are secured, in the embodiment illustrated, within a frame 16, although the frame 16 is in no way essential to the operation of the invention, and simply ensures the stability of the apparatus 10 during use. Each reservoir 12, 14, contains growth medium 18 therein which supports, in use, a biofilm thereon for effecting the biological processing of fluid contained within either reservoir 12, 14. The reservoirs 12, 14 may be of any suitable shape/form, and may be formed from any suitable material, preferably a plastic or the like.

Each reservoir 12, 14 is capable of operating, in isolation, in substantially conventional fashion, whereby fluid could be introduced into the reservoir 12, 14, such as to cover the growth medium 18, and therefore the biofilm thereon, wherein the biofilm would affect the aerobic/anaerobic processing of the fluid over an extended period, usually a number of hours or days. During the processing period, the biofilm is immersed in the wastewater, and consumes the contaminants therein, or converts same into less harmful substances, by anaerobic or anoxic processes, or by aerobic processes when oxygen is present. Aerobic processing would therefore require a supply of oxygen to be pumped into the respective reservoir 12, 14 in order to ensure the continued aerobic processing, when necessary, of the wastewater. Such oxygenation is generally costly, and adds significantly to the complexity of the arrangement, and must be carefully maintained in order to ensure correct operation. The apparatus 10 of the present invention avoids the need for such costly and complex additions by utilising the first reservoir 12 and second reservoir 14 in sequence, as will be described in detail hereinafter, in order to achieve significant aeration of the biofilms within each reservoir 12, 14.

In brief, wastewater is introduced into the first reservoir 12 or the second reservoir 14, generally from a main feed tank (not shown) or the like, and is held in the respective reservoir 12, 14 in order to begin the biological processing thereof by the respective biofilm. For the following description of the operation of the apparatus 10, the wastewater is taken to have been initially fed to the first reservoir 12, although it will be appreciated that it could equally be fed to the second reservoir 14, both reservoirs 12, 14 being essentially identical. While the wastewater is being processed by the biofilm in the first reservoir 12, the biofilm in the second reservoir 14 is exposed to the atmosphere, as the second reservoir 14 is substantially empty. This biofilm therefore receives oxygen from the air under a high concentration gradient, thereby promoting the aerobic growth of the biofilm. After a set period, the wastewater is transferred from the first reservoir 12 into the second reservoir 14, and maintained therein for a further set period, thereby effecting the further biological processing of the wastewater. While this is occurring, the biofilm in the first reservoir 12 is exposed to the atmosphere, again promoting the aerobic growth of same. This sequence is repeated a number of times until the wastewater has been satisfactorily treated, following which the wastewater, or at least a portion thereof, is withdrawn from the apparatus 10, and a new batch of wastewater introduced into same.

In the embodiment illustrated, the first reservoir 12 has a first pump 20 in operative association therewith, for pumping fluid from the first reservoir 12 to the second reservoir 14. The first pump 20 is connected to the first reservoir 12, preferably at or adjacent a base thereof, by a hydraulic conduit in the form of a first drain pipe 22, while a first feed pipe 24 extends from the first pump 20 to the second reservoir 14, for transporting fluid from the first pump 20 to the second reservoir 14. The first pump 20 may be of any suitable form, and may be driven by any suitable means, although the first pump 20 is preferably hydraulically or electrically driven, most preferably electrically driven.

The apparatus 10 further comprises a second pump 26 in operative association with the second reservoir 14, for pumping fluid back to the first reservoir 12 from the second reservoir 14. A hydraulic conduit in the form of a second drain pipe 28 connects the second pump 26 to the second reservoir 14, preferably from at or adjacent a base of the second reservoir 14, while a second feed pipe 30 extends from the second pump 26 to a top of the first reservoir 12, to transport the fluid from the second pump 26 to the first reservoir 12. The above-mentioned arrangement therefore allows fluid to be transferred easily between the reservoirs 12, 14. It should however be appreciated that any other suitable means could be used to transfer fluid between the first and second reservoirs 12, 14, and the above described arrangement is simply a preferred configuration.

Although not illustrated, suitable means for initially introducing the wastewater into the apparatus 10 may be provided as part of the apparatus 10, but will normally be a separate component, conventionally associated with the feed tank (not shown) or the like from which the wastewater is supplied. Such means could be connected into one or other of the first feed pipe 24 or second feed pipe 30.

The apparatus 10 is also provided with an effluent valve 32, preferably in the first reservoir 12, in order to facilitate the withdrawal of the treated wastewater from the apparatus 10. In the embodiment illustrated, the effluent valve 32 is solenoid operated, in order to allow the automated operation of same, by any suitable control equipment (not shown) or the like. The effluent valve 32 could of course be manually operable, or may be operated by any other suitable means. In addition, any other suitable equivalent could be substituted for the effluent valve 32, in order to allow the wastewater to be drained from the apparatus 10. The effluent valve 32 will conventionally be connected to a suitable drain (not shown) or the like, or could connect to a further reservoir (not shown) from which the treated wastewater is re-used for any suitable purpose.

The apparatus 10 is also preferably provided with dispersing means in the form of a dispersion plate 34 mounted adjacent a free end of each of the first feed pipe 24 and the second feed pipe 30, in order to disperse the fluid entering each reservoir 12, 14. This dispersing of the fluid acts to prevent the biomass colonising the growth medium 18 from being forceably washed off same. If the dispersion plates 34 were omitted, the fluid exiting the respective feed pipe 24, 30 would cascade directly onto the growth medium 18, possibly dislodging the biofilm thereon. The dispersion plates 34 may be of any suitable form, and could for example be provided as a dispersing nozzle (not shown) mounted to the free end of each feed pipe 24, 30.

Also mounted within each reservoir 12, 14 is a lower switch 36, preferably just below the lower level of the growth medium 18, and an upper switch 38, preferably just above the upper level of the growth medium 18. The switches 36, 38 are each operable to detect the level of fluid within the respective reservoirs 12, 14 and to actuate the first pump 20 and/or the second pump 26 as required, as will be described hereinafter in detail. The switches 36, 38 are preferably conventional float switches, but could of course be of any other suitable form.

The operation of the apparatus 10 will now be described in detail. Initially, as indicated above, wastewater is introduced into the first reservoir 12, and held in the first reservoir 12 for a pre-determined period, which will vary depending on the type/condition of the wastewater to be treated, and therefore the type of treatment to be effected, as detailed in the examples given below. The wastewater is then pumped into the second reservoir 14 by the first pump 20, which will pump the wastewater until the level in the first reservoir 12 reaches that of the lower switch 36, or alternatively when the level of the second reservoir 14 reaches that of the upper switch 38, wherein the respective switch 36, 38 is actuated, and is adapted to switch off the first pump 20. The very act of pumping the wastewater will result in the aeration of same, while the biofilm in the second reservoir 14 will have been receiving oxygen from the air, promoting the aerobic growth thereof. The wastewater is then held in the second reservoir 14 for a pre-determined period, before being pumped back into the first reservoir 12. Thus as the wastewater is cycled between the reservoirs 12, 14, the respective biofilms will effect the efficient aerobic processing thereof. If nitrogen is present in the wastewater, and thus de-nitrification of same is necessary, the wastewater may be held in one or other of the reservoirs 12, 14 for a prolonged period, for example a number of hours, whereby any oxygen in the wastewater will be quickly consumed by aerobic processes, which will then lead to anaerobic conditions in the wastewater, and thus de-nitrification will be effected by the respective biofilm.

Where aerobic processing is required for the removal of organic carbon, the cycle of pumping between the first reservoir 12 and the second reservoir 14 is preferably in the order of 10 minutes, although this may of course vary to suit particular requirements. The pumps 20, 26 are therefore preferably controlled by timers (not shown), which are programmable in order to allow various sequences to be implemented by the apparatus 10. The pumps 20, 26, and the switches 36, 38 are therefore preferably connected to and controlled by a conventional programmable logic controller (PLC) (not shown). The PLC may therefore be programmed to suit the type of wastewater to be processed, according to whether the wastewater contains carbon, nitrogen or phosphorus, etc.

Once the wastewater has been suitably processed, the wastewater is allowed to settle in the first reservoir 12, following which the effluent valve 32 is opened, again preferably by the PLC, and the treated wastewater decanted before the introduction of more untreated wastewater to the apparatus 10.

The normal operation of the apparatus 10 thus includes a number of phases for each cycle of wastewater treatment, namely fill, react, settle and empty. The times of the individual phases may vary considerably depending on the type of processing to be carried out. The following examples illustrate some of the possible sequences which may be effected by the apparatus 10.

For organic carbon removal and settlement of solids these phases would be:
  Fill (0.25 hrs), the wastewater would be pumped to the first reservoir 12 which could be up to ½ full from the previous cycle React (4 hrs), the wastewater would be pumped back and forth between the reservoirs 12, 14 aerating and bringing the wastewater in contact with the biomass resulting in organic carbon removal and nitrification of ammonium nitrogen to nitrate nitrogen Settle (0.5 hrs), the wastewater would be allowed to settle in the first reservoir 12

Empty (0.5 hrs), the clarified wastewater at the top of the reservoir 12 would be decanted, via the effluent valve 32.

For organic carbon and nitrogen removal, and the settlement of solids these phases would be:

Fill (0.25 hrs), the wastewater would be pumped to the first reservoir 12 which could be up to ½ full from the previous cycle React 1 (4 hrs), the wastewater would be left in the first reservoir 12 where low dissolved oxygen condition would lead to the denitrification of the nitrate nitrogen to nitrogen gas in the water from the previous cycle React 2 (4 hrs), the wastewater would be pumped between the reservoirs 12, 14 aerating and bringing the wastewater in contact with the biomass resulting in organic carbon removal and nitrification of ammonium nitrogen to nitrate nitrogen Settle (0.5 hrs), the wastewater would be allowed to settle in the first reservoir 12

Empty (0.5 hrs), the clarified wastewater at the top of the first reservoir 12 would be decanted.

For organic carbon, nitrogen and phosphorus removal, and the settlement of solids these phases would be:

Fill (0.25 hrs), the wastewater would be pumped to ½ fill the first reservoir 12, which would be empty from the previous cycle; the second reservoir 14 would be already ½ full.

React 1 (4 hrs), the new wastewater would be left in the first reservoir 12 where low dissolved oxygen condition would lead to the uptake of organic carbon and the release of phosphorus from the phosphorus accumulating organisms (PAO) into solution.

React 2 (4 hrs), the wastewater from the previous cycle in the second reservoir 14 would be pumped to the first reservoir 12 where low dissolved oxygen condition would lead to the denitrification of the nitrate nitrogen to nitrogen gas in the water from the previous cycle.

React 3 (4 hrs), the wastewater would be pumped between the reservoirs 12, 14 aerating and bringing the wastewater in contact with the biomass resulting in organic carbon and luxury phosphorus uptake by the PAO, and nitrification of ammonium nitrogen to nitrate nitrogen Settle (0.5 hrs), the wastewater would be allowed to settle in the second reservoir 14

Empty (0.5 hrs), the clarified wastewater at the top of the second reservoir 14 would be decanted. Some biosolids would also be removed to take out the phosphorus in the PAO cells.

During the processing of wastewater by the apparatus 10, the biofilm in each reservoir 12, 14 will grow in volume, which in conventional biomass reactors (not shown) can lead to clogging of the growth medium therein. However, the growth medium 18 in each reservoir 12, 14 is preferably of vertical tubular form, in particular an array of vertically oriented tubular elements, which will therefore prevent the clogging of same by excess biomass growth, as the biofilm colonising the growth medium 18 would not be capable of holding up a column of wastewater of approximately 1 m or more. In use, the growth medium 18 is likely to be at least 1 m in height. Thus any excess growth of the biofilm will be stripped off the growth medium 18 by the head of wastewater acting thereon. However, as a further precaution against clogging, the upper limit on the surface area per unit volume for the growth medium 18 may be set by the on-set of bridging. This phenomenon occurs when the biofilms on opposing faces of the growth medium 18 become sufficiently thick to meet one another and thereby form an uninterrupted biomass. When this happens the efficiency of the growth medium 18 is substantially reduced by the massive reduction in surface area occurring as a result of this blockage. The growth medium 18 may be formed from any suitable material, in particular plastic, preferably with a specific surface area of about 240 $m^2/m^3$.

The growth medium 18 is also preferably elevated slightly off the base of the respective reservoir 12, 14, in order to allow suspended solids, or indeed any biomass which has become separated from the growth medium 18, to settle to the base of the respective reservoir 12, 14, which may then be removed from the reservoir 12, 14 by any suitable means, in conventional fashion. As the growth medium 18 is elevated, any matter collecting at the base of the respective reservoir 12, 14 will not cause a blockage of the growth medium 18.

The apparatus 10 therefore provides an arrangement for alternatively exposing the biofilms within the reservoirs 12, 14 to air and wastewater by pumping the wastewater between the reservoirs 12, 14, making it possible to achieve sequential aerobic, anoxic and anaerobic conditions in the biofilms on the growth medium 18.

Figure 4:
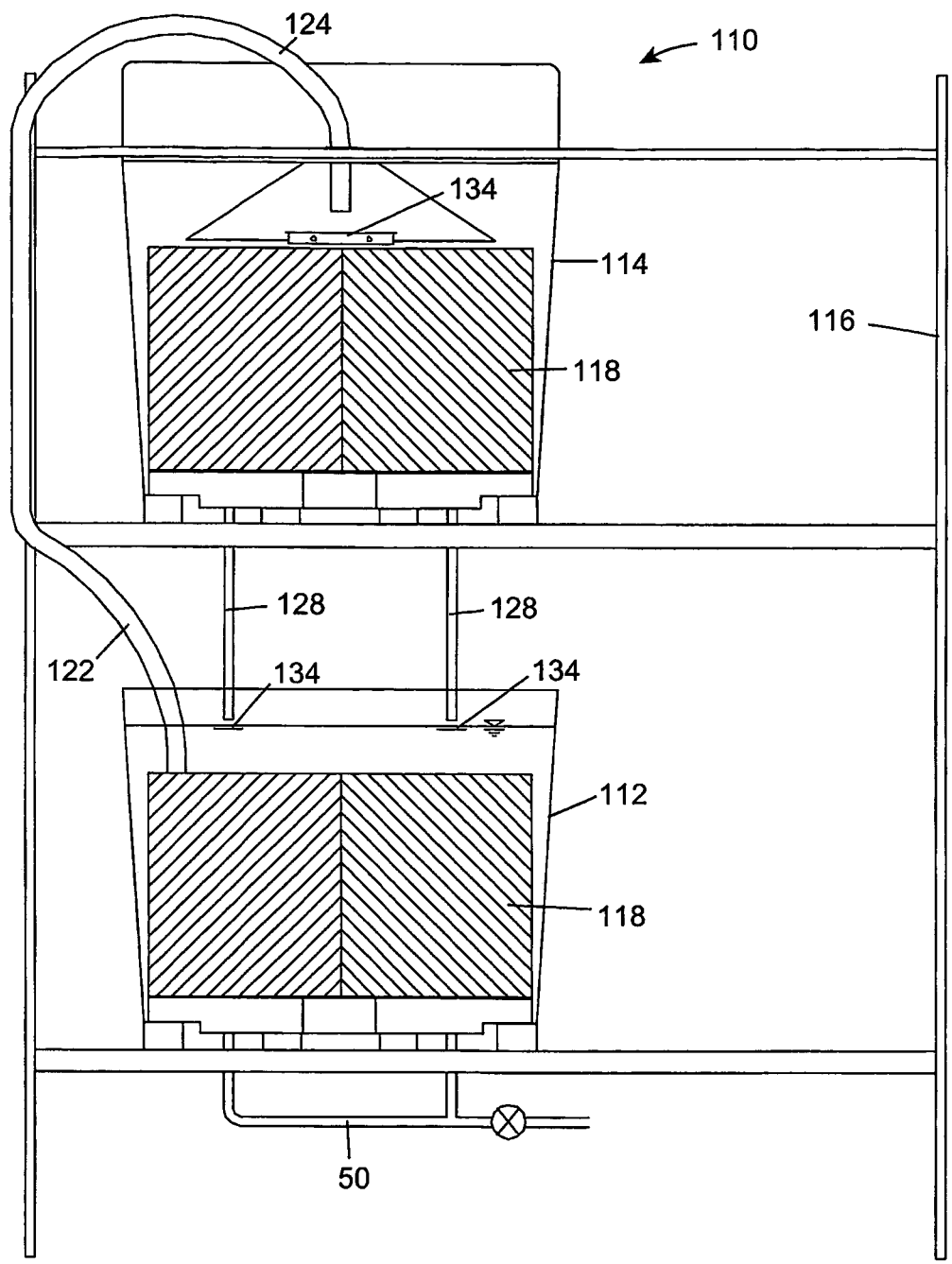
FIG. 4 illustrates a sectioned front elevation of a second embodiment of an apparatus according to the present invention.

Turning now to FIG. 4, there is illustrated an alternative embodiment of an apparatus according to the present invention, generally indicated as 110, again for effecting the biological processing of wastewater or the like. In this alternative embodiment, like components have been accorded like reference numerals, and unless otherwise stated, perform a like function. The apparatus 110 therefore comprises a first reservoir 112 and a second reservoir 114, both mounted within a frame 116. However, in this embodiment, the second reservoir 114 is mounted above the first reservoir 112, in order to facilitate the gravity driven transfer of wastewater from the second reservoir 114 to the first reservoir 112. Each reservoir 112, 114 is provided with growth medium 118 therein, which in use is colonised by a biofilm (not shown) for effecting the biological processing of the wastewater.

The apparatus 110 comprises a first pump (not shown) which is operable to draw wastewater from the first reservoir 112 via a first drain pipe 122 extending from at or adjacent a base of the first reservoir 112, which extends upwardly to form a first feed pipe 124 which is directed into a top of the second reservoir 114. Extending downwardly from a base of the second reservoir 114 are a pair of second drain pipes 128, extending into a top of the first reservoir 112, in order to allow the transfer of wastewater from the second reservoir 114 into the first reservoir 112. Each of the second drain pipes 128 preferably includes a drain valve (not shown) in operative association therewith, which is selectively operable in order to allow the transfer of wastewater from the second reservoir 114. Dispersing means in the form of dispersion plates 134 are also provided adjacent the free end of the first feed pipe 124 and the pair of second drain pipes 128.

Although not illustrated, the apparatus 110 is also preferably provided with a pair of float switches (not shown) or the like in each reservoir 112, 114, in order to effect the operation of the first pump (not shown), and the drain valves (not shown) associated with the second drain pipes 128.

The apparatus 110 is also provided with a sludge drain 50 extending from the base of the first reservoir 112, in order to allow the removal of any settled solids or biomass from the apparatus 110.

It will therefore be appreciated that the apparatus 10 is operated in essentially identical fashion to the apparatus 10 of the first embodiment, the only difference being the gravity driven return of the wastewater from the second reservoir 114 to the first reservoir 112.

It should also be noted that the operation of the reactor 10; 110 may be supplemented with pre-processing and/or post-processing of the wastewater, in order to achieve desired results, in particular a reduction in the hydraulic retention time of the wastewater within the reactor 10; 110. For example, a settlement tank (not shown) or the like could be provided upstream of the reactor 10; 110 in order to temporarily hold the wastewater prior to it being introduced into the reactor 10; 110, as will be described hereinafter. This allows the hydraulic retention time of the reactor 10; 110 to be significantly reduced, with a further reduction being possible if a clarifier tank (not shown) or the like is also provided downstream of the reactor 10; 110. The upstream settlement tank (not shown) will allow heavier contaminants to settle out of the wastewater and hydrolyse, thereby reducing the hydraulic retention time in the reactor 10; 110. This hydrolysis helps in the breakdown of complex molecules and as a result facilitates faster uptake, in the reactor 10; 110, of substrates within the wastewater.

The downstream clarifier tank (not shown) allows any biomass suspended within the treated wastewater to settle out, thereby further reducing the hydraulic retention time of the first reservoir 12; 112, which would otherwise have to be sufficiently prolonged to allow such settlement to occur within the first reservoir 12; 112. The following example is given as an indication of how the above described pre-processing and post-processing may be combined with the reactor 10; 110 in order to significantly reduce the hydraulic retention time of the reactor 10; 110.

The reactor 110 of the second embodiment is preferably employed, although it will be appreciated that the reactor 10 of the first embodiment could also be employed, but the reactor 110 allows a reduction in the number of pumps (not shown) to be used, due to the capability of the reactor 110 to displace wastewater from the second reservoir 114 to the first reservoir 112 solely under the influence of gravity. Thus during operation the wastewater is initially fed to a settlement tank (not shown) upstream of the reactor 110, in which heavier solids are allowed to settle and hydrolysis occur. The wastewater is then fed, for example using a pump (not shown) or the like, into the second reservoir 114, approximately every thirty eight minutes, for a duration of approximately ten minutes. At this point the first reservoir 112 will already contain wastewater from the previous cycle. At the same time as the waste water is being introduced into the second reservoir 114 from the settlement tank (not shown), waste water from the first reservoir 112 is pumped into the second reservoir 114 for a duration of approximately eighteen minutes. The mixed waste water within the second reservoir 114 is treated therein, by the biofilm colonising the growth medium 118, and is then allowed to flow, under the influence of gravity, into the first reservoir 112, for further treatment. The second reservoir 114 is completely emptied after a period of about eight minutes, and therefore approximately twenty six minutes from the start of the cycle, thereby exposing the biofilm. At the same time approximately 50% of the treated wastewater from the first reservoir 112 is fed to a clarifier tank (not shown), wherein any suspended solids are allowed to settle. At this point the wastewater within the clarifier tank (not shown) has been fully processed. The cycle is then repeated again, a period of approximately thirty eight minutes from the start of the previous cycle.

It will of course be appreciated that the method and apparatus of the present invention are not limited in use to the treatment of wastewater or the like. The method and apparatus may be utilised in the production of a large number of products by various means, for example fermentation processes or the like, or the production of biogas for use as a fuel, or indeed for producing biomass itself, from which various substances/products may be extracted. For example, the biomass in the apparatus 10; 110 could be used in fermenting certain aqueous solutions to produce ethanol, citric acid, or acetone as primary metabolites, while secondary metabolites such as penicillin may also be produced during such fermentation processes. The biomass itself may be harvested from the apparatus 10; 110, and various cells and metabolites isolated therefrom, for example amino acids, hydrocarbons, polysaacharide, etc.

The invention claimed is:

1. An apparatus for biologically processing fluid, the apparatus comprising a first reservoir containing growth medium, for supporting a biofilm thereon, and in a position where the growth medium can be covered by the fluid; a second reservoir adapted to receive fluid from the first reservoir in order to maintain the fluid, in use, out of contact with the biofilm, thereby exposing the biofilm to air in order to promote aerobic growth, the second reservoir containing growth medium for supporting a biofilm thereon; and transfer means operable to transfer fluid directly between the first reservoir and the second reservoir and directly between the second reservoir and the first reservoir and wherein the reservoirs are adapted to permit the gravity driven flow of fluid from the second reservoir to the first reservoir.

2. An apparatus according to claim 1 in which the transfer means is adapted to aerate the fluid during transfer of the fluid between the reservoirs.

3. An apparatus according to claim 1 in which the transfer means comprises a first hydraulic conduit extending from the first reservoir to the second reservoir.

4. An apparatus according to claim 3 in which the transfer means further comprises a second hydraulic conduit extending from the second reservoir to the first reservoir.

5. An apparatus according to claim 4 in which the transfer means comprises at least one pump in operative association with either the first hydraulic conduit and/or the second hydraulic conduit.

6. An apparatus according to claim 4 in which the or each hydraulic conduit extends from at or adjacent a base of the respective reservoir.

7. An apparatus according to claim 4 in which the or each hydraulic conduit is arranged to feed the respective reservoir from a position at or adjacent a top of the reservoir.

8. An apparatus according to claim 4 comprising means for dispersing the fluid exiting the or each hydraulic conduit.

9. An apparatus according to claim 1 comprising a timer for operating the transfer means at set intervals.

10. An apparatus according to claim 1 comprising one or more sensors in operative association with the transfer means, the one or more sensors being arranged to actuate the transfer means when the water in the first and/or the second reservoir reaches a pre-determined level.

11. An apparatus according to claim 1 in which the apparatus comprises means for introducing fluid into the first and/or the second reservoir.

12. An apparatus according to claim 1 comprising means for withdrawing fluid from the first and/or the second reservoir.

13. An apparatus according to claim 1 in which the reservoirs are adapted to be stacked one above the other.

14. An apparatus according to claim 1 in which the growth medium is substantially vertically oriented within the or each reservoir.

15. An apparatus according claim 1 in which the growth medium comprises an array of, in use, vertically oriented tubular elements.

16. A method for biologically processing fluid, the method comprising the steps of introducing the fluid into a first reservoir containing growth medium supporting a biofilm thereon such that the growth medium is covered by the fluid; transferring at least a portion of the fluid directly into a second reservoir containing growth medium supporting a biofilm thereon in order to expose at least a portion of the biofilm in the first reservoir to air; and returning at least a portion of the fluid from the second reservoir directly to the first reservoir by means of the gravity driven flow of fluid from the second reservoir to the first reservoir.

17. A method according to claim 16 further comprising the step of pumping the fluid between the first and second reservoirs in order to effect aeration of the fluid.

18. A method according to claim 16 further comprising automatically transferring the fluid between the reservoirs after a pre-determined interval.

19. A method according to claim 16 further comprising drawing the fluid from the respective reservoir from at or adjacent a base thereof.

20. A method according to claim 16 further comprising introducing the fluid into the respective reservoir from at, or adjacent a top thereof.

21. A method according to claim 16 further comprising the step of dispersing the fluid during entry to the respective reservoir.

22. A method according to claim 16 further comprising the step of locating one reservoir above the other in order to allow the gravity driven flow of fluid from the raised reservoir.

* * * * *